United States Patent [19]

Farrar et al.

[11] Patent Number: 4,503,172

[45] Date of Patent: Mar. 5, 1985

[54] WATER SOLUBLE POLYMERS

[75] Inventors: David Farrar, Bradford; Malcolm Hawe, Huddersfield, both of England

[73] Assignee: Allied Colloids Limited, Bradford, England

[21] Appl. No.: 612,185

[22] Filed: May 21, 1984

[30] Foreign Application Priority Data

May 20, 1983 [GB] United Kingdom ............... 8313976
Aug. 12, 1983 [GB] United Kingdom ............... 8321731

[51] Int. Cl.$^3$ ........................... C08F 6/04; C08F 6/10
[52] U.S. Cl. ................................. 523/336; 523/332; 523/337; 524/814; 524/832; 526/288; 526/317
[58] Field of Search ............... 523/336, 332, 337, 339; 524/814, 832; 526/288, 317

[56] References Cited

U.S. PATENT DOCUMENTS

| | | | |
|---|---|---|---|
| 3,296,172 | 1/1967 | Funck et al. | 523/332 |
| 3,759,860 | 9/1973 | Peaker | 524/460 |
| 3,840,487 | 10/1974 | Dyson et al. | 524/394 |
| 3,879,357 | 4/1975 | Wingler et al. | 526/317 |
| 4,435,528 | 3/1984 | Domina | 523/336 |

FOREIGN PATENT DOCUMENTS

| | | |
|---|---|---|
| 0046573 | 3/1982 | European Pat. Off. |
| 0068887 | 1/1983 | European Pat. Off. |
| 1414964 | 1/1973 | United Kingdom |
| 1505555 | 3/1978 | United Kingdom |
| 2109363 | 6/1983 | United Kingdom |

*Primary Examiner*—Ronald W. Griffin
*Attorney, Agent, or Firm*—Lawrence Rosen

[57] ABSTRACT

A water soluble polymer containing acid groups can be fractionated into higher and lower molecular weight fractions by partial neutralization of the polymer as a solution in a blend of water and a low molecular weight alcohol and separating the resultant aqueous and organic phases.

10 Claims, No Drawings

WATER SOLUBLE POLYMERS

It is standard practice to make water soluble acidic polymers, such as polyacrylic acid, by solution polymerisation in which event the solvent may be a blend of water and an organic liquid such as isopropanol. The product of the polymerisation is a solution of polymer together with some oligomer and unreacted monomer.

One process that we have used for removing the unwanted low molecular weight components, i.e. the oligomer and monomer, has involved adding excess sodium hydroxide to the solution so as to neutralize all the acidic grous, and allowing the mixture to separate into an upper isopropanol fraction containing the unwanted low molecular weight components and a lower aqueous fraction containing the desired polymer. This fractionation has been regarded merely as a way of separating the useful polymer from the unwatned by-products. The useful polymer is a blend of molecules of various molecular weights and in practice commercially available products generally have a polydispersity (PD) above 2 although some products may be lower, for instance 1.8. PD is the weight average molecular weight Mw divided by the number average molecular weight Mn.

A particular process for separating unwanted by-products is described in European Patent Publication No. 46573. In this it is said that the aqueous solution of polymer may be neutralised and various alkali metals and amines, for instance ethanolamine and other amines, are mentioned, and it is stated that the neutralised polymerisate may then be treated in the usual way with polar solvents, methanol, ethanol, propanol, isopropanol, acetone and tetrahydrofuran being mentioned. In the examples 80 grams fully neutralised sodium polyacrylate is fractionated in solution in 500 grams water with 400 grams methanol or 40 grams isopropanol. In each instance the lighter, organic, phase is rejected. This therefore seems to be a conventional fractionation to remove oligomers and the product would therefore be a conventional blend of molecular weights. If the starting polymer mixture is conventional the Mw, Mn and PD values of the extracted polymer will be conventional, eg PD above 1.8.

The same patentees have published in their later British patent specification No. 2109363 a generally similar disclosure of treating the aqueous polymerisate with polar solvents except that no process details are given and in this example the organic fraction is said to be a useful product having a molecular weight distribution ranging between 400 and 1,200 and the aqueous fraction is said to have a molecular weight ranging between 1,200 and 12,000.

Whenever a water soluble acidic polymer is made it is generally used in the form of a fully neutralised salt although in some instances a partially neutralised salt may be used. The polymer may be supplied to the user as a solution, for instance as a solution in which it was made initially, optionally after distilling any organic solvent from the solution, or the polymer may be separated from the solution, for instance by precipitation by the addition of an insolubilising material, such as excess acetone.

It is well recognised that minor variations in the polymerisation conditions used for making the polymer can greatly affect the activity of the product for any particular purpose, and so manufacturers exercise great care in optimising their process conditions to make a product that has optimum activity for its intended purpose.

It is known that the molecular weight of the polymer can make significant differences to the properties of the polymer (see for instance British Patent Specification Nos. 1414964 and 2109363) but it is also known to be very difficult to control the molecular weight accurately during polymerisation. Fractional precipitation of the polymer, for instance as described in British Patent Specification No. 1414964 is not commercially practicable as a way of producing selected molecular weight products on a commercial scale. Fractionation of a neutralised solution, for instance as described in the examples of European Patent Publication No. 46573, merely gives an uncontrolled fractionation between very low molecular weight products on the one hand and higher molecular weight products on the other.

It has been our object to devise a process by which a water soluble acidic polymer can be fractionated into higher and lower molecular weight fractions and in which the molecular weight in each fraction can be freely selected simply by appropriate selection of the fractionation conditions.

In the invention a solution is formed in a blend of water and a polar solvent of a water soluble polymer containing neutralised acid groups and the solution is separated into an aqueous phase containing a higher molecular weight fraction of the polymer and an organic phase containing a lower molecular weight fraction of the polymer, and in this process the polar solvent is a $C_1$ to $C_5$ alcohol, the acid groups are neutralised with cations selected from sodium, potassium, lithium and ammonium and the molar proportion of neutralised acid groups is 10 to 55% when the cation is selected from sodium and potassium, 10 to 70% when the cation is ammonium and 30 to 90% when the cation is lithium.

The precise split between the lower and higher molecular weight fractions can be selected by altering the process conditions, and in particular the degree of neutralisation, and so the invention provides, for the first time, a simple process by which an acidic, water soluble, polymer can be fractionated into preselected molecular weight fractions. Unlike prior processes where the organic fraction is usually rejected, in the invention both fractions of polymer are commercially useful and so are recovered and used, the fraction in the organic phase being useful where lower molecular weights are desired and the fraction in the aqueous phase being useful where higher molecular weights are desired.

Additionally we have surprisingly found that the polymer in each fraction generally has at least one activity that is very much improved compared to the activity of the starting polymer. Often the polymer of one fraction has one type of greatly improved activity (for instance as a viscosifier) while the polymer in the other fraction may have a different type of greatly improved activity (for instance as a dispersant).

The polymer in each fraction will have lower polydispersity (weight average molecular weight divided by number average molecular weight) than the starting polymer. For instance the initial value is almost always above 1.6, and often is above 2, but the fractions obtained in the invention often have values of below 1.5, often 1.05 to 1.45 and most preferably 1.1 to 1.4.

Each of the polymer solutions can be used in the form in which it is obtained by phase separation, for instance simply by mixing the solution into the water or other liquor to be treated, or the polymer can be recovered from the solution by evaporation, precipitation or other conventional recovery techniques. The polymer in each of the separated solutions is generally in a partially neutralised state and can be acidified or fully neutralised in conventional manner if desired.

The polymer can be any water soluble polymer containing acidic groups and may have been made by any suitable polymerisation technique. The polymer is generally obtained by polymerisation of an ethylenically unsaturated monomer that contains acid groups either alone or with other ethylenically unsaturated monomeric material. Oligomers formed from the corresponding monomers may be used in place of the monomers. The acid groups are generally carboxylic acid or sulphonic acid groups. The monomers are often acrylic monomers and therefore preferred acidic monomers include one or more of methacrylic acid or, especially, acrylic acid or 2-amido-2-methyl propane sulphonic acid, but a wide range of other polymerisable acidic monomers can be used, for instance maleic acid or vinyl sulphonic acid. Any comonomers that can be copolymerised, in the amounts present, with the acidic monomer or monomers to form a water soluble polymer can be used and include monomers such as acrylamide, acrylonitrile and acrylic esters. Generally at least 50% by weight and often at least 80% by weight of the monomers from which the polymer is formed are acidic monomers. The polymer is generally a linear polymer.

Preferred polymers for use in the invention are polyacrylic acid homopolymers but other very valuable polymers that may be treated in the invention are acrylic acid copolymers, especially copolymers with 2-acrylamido-2-methyl propane sulphonic acid or its salts.

The average molecular weight of the polymer that is to be fractionated can vary widely provided the value is not so high that the polymer is insoluble. Generally it is 500 to 1 million and the most valuable advantages are found when the average molecular weight is below 100,000, generally below 30,000 and especially between 1,000 and 10,000, for instance around 1,500 to 4,500.

The polymer may have been made by any conventional polymerisation process and may have then been isolated, for instance as a solid, from any liquid phase in which it was formed, and then redissolved in the aqueous organic alkaline solution used in the invention. Generally however the process of the invention is conducted on a solution of the polymer obtained by solution polymerisation of the appropriate monomers. The preferred solution polymerisation medium is an aqueous solution containing appropriate initiators or other polymerisation promotors, for instance water soluble peroxides and persulphates, or redox catalysts or catalysts for photopolymerisation and will generally include an organic solvent, for instance as a molecular weight regulator. Other known molecular weight regulators may be included in the solution if desired.

When the solution of polymer is made by polymerisation in a mixture of water and organic solvent this organic solvent may serve as the organic liquid for use in the invention. A very common solvent in solution polymerisations is isopropanol and blends of water and isopropanol are suitable for many processes according to the invention.

Irrespective of whether the solution is made by blending preformed polymer, water, organic solvent and alkali or by adding alkali to the reaction product of polymerisation in aqueous organic liquid, or in any other manner, the process of the invention requires that phase separation should be brought about between aqueous and organic phase in the presence of the specified solvents and the specified amounts of the specified cations. If other solvents, other cations or other amounts of the specified cations are used the process generally will not give the variable fractionation of the invention but instead will either give no useful results or will merely strip oligomer and monomer from the product. For instance it is not possible to select the degree of fractionation if the organic solvent is acetone or tetrahydrofuran or if the cation is provided by an amine such as ethylamine.

The degree of neutralisation of the acid groups controls the fractionation. The results obtained in any particular process will depend upon, inter alia, the concentrations, the polymer type and the solvent but there is a minimum degree of neutralisation below which substantially no fractionation occurs and the system may instead remain as a homogeneous solution. When the cation is sodium, potassium or lithium the degree of neutralisation will normally be at least 10%, often at least 15% and preferably at least 25% whilst if the cation is lithium the degree of neutralisation will normally have to be at least about 30%, preferably at least 40% and generally at least 50%. If the degree of neutralisation is too high the size of the lower molecular weight fraction is unacceptably low. When the cation is sodium or potassium the degree of neutralisation will normally be below 55%, preferably below 50% and most preferably below 40%. When the cation is ammonium the degree of neutralisation will normally be below 70%, preferably below 60% and most preferably below 50%. When the cation is lithium the degree of neutralisation will normally be below 90%, and preferably below 70%.

In any particular process the size of, for instance, the higher molecular weight fraction can be increased (with consequential reduction in its average molecular weight and consequential reduction in the size and the average molecular weight of the lower molecular weight fraction) by increasing the amount of alkali and conversely the size of the low molecular weight fraction can be increased by reducing the amount of alkali.

The process conditions are preferably selected such that each fraction contains from 20 to 80%, and most preferably 30 to 70%, by weight of the starting polymer.

The partial neutralisation of the acidic polymer is normally achieved by adding a compound that will provide the chosen cation, the compound usually being a hydroxide, in the selected amount to the dissolved polymer. Mixtures of two or more of the four cations may be utilised, in which event the proportions will be selected such that they have the same effect as the amounts specified for the individual cations.

For any particular polymer, the degree of fractionation is dependent not only on the degree of neutralisation and the type of cation but also upon the concentration of the polymer and the choice and amount of the alcohol. The alcohol is preferably isopropanol but propanol and other alcohols, especially $C_2$ to $C_5$ alcohols, may be used. The proportion water:alcohol by weight is preferably from 1:0.2 to 1:5, most preferably 1:0.5 to 1:2 with best results generally being achieved, especially when the alcohol is isopropanol and the cation is sodium, when the proportion is about 1:1. The proportions should be selected such that, having regard to the degree and nature of neutralisation, each of the phases will have a polymer concentration of at least 5%, generally at least 10% and preferably at least 15% by weight of the phase.

The amount of the polymer (measured as the acid polymer) is normally at least 5% by weight based on the weight of polymer, alcohol and water (including water introduced with the alkali) and preferably is at least 10%. The concentration must not be so high that the system is so viscous that mixing and phase separation is significantly impeded and so is generally below 30%. Preferably the concentration is 15 to 25% by weight.

The phase separation may also be affected by the temperature at which the process is conducted. This may be between 15° and 80° C. but preferably is between 30° and 70° C.

The process may be conducted by combining the essential components of the solution in any convenient manner, for instance by adding aqueous alkali to the aqueous organic reaction product obtained by polymerisation of the monomer or monomers in aqueous organic solution. The process may be conducted continuously or batchwise. Depending upon the degree of neutralisation, and type and strength of base, the concentration of the polymer, the amount of solvent and the temperature the phase separation may occur rapidly or slowly. For instance it may occur substantially instantaneously or it may be necessary to leave the system to stand for periods of, for instance, 5 minutes to 2 hours, typically 30 minutes to 1 hour. The separation may be conducted batchwise or continuously, with the mix being fed through a conventional separation column or separation reactor.

The two phases are kept separate, may be fully neutralised with the same or different alkali and organic solvent may be stripped from the organic phase by distillation.

Each of the polymer fractions is recovered for subsequent commercial use. The polymers may be used, for instance, as sand grinding aids for marble grinding, pigment dispersants, paint additives, viscosifiers or desalination aids.

The following are some examples of the invention.

EXAMPLE 1

A 23% by weight solution of polyacrylic acid in a blend of equal parts by weight isopropanol and water was prepared by polymerisation of acrylic acid using ammonium persulphate as initiator, in conventional manner. Samples of the product were extracted while other samples were neutralised by the addition of varying amounts of sodium hydroxide, introduced as a 46% by weight aqueous solution. Each of the samples, after the addition of sodium hydroxide, was allowed to stand for sufficient time for an aqueous phase to separate from an organic phase (that probably contained some water) and these phases were then separated from one another in conventional manner. Each phase was then fully neutralised with sodium hydroxide and the residual alcohol was removed by distillation.

The yield of polymer in each of the phases was recorded. The products were adjusted to 40% active solids and compared as marble grinding aids as described in Example 11 of British Patent Specification No. 1,414,964. The results are set out in Table 1.

TABLE 1

| Percent Neutralisation | Yield Percent Organic | Yield Percent Aqueous | Aqueous Layer Milling index |
| --- | --- | --- | --- |
| 0* | — | — | 0.25 |
| 10 | 87.2 | 12.8 | — |
| 15 | 79.3 | 20.7 | — |
| 25 | 23.1 | 76.9 | 1.94 |
| 50 | 4.0 | 96.0 | 2.33 |
| 75 | 0.7 | 99.3 | 1.22 |
| 100 | 0.5 | 99.5 | 0.37 |

*This product is made in conventional manner by full neutralisation followed by removal of the organic phase by distillation and so there is no fractionation.

In the described test a milling index value of around 0.5 is generally satisfactory as it indicates commercially acceptable properties for preventing gelation of the marble dispersion.

It is apparent from the table that after full neutralisation almost all the polymer is in the aqueous phase but that substantial amounts of polymer go into the organic phase at low degrees of neutralisation. It is also very notable that the milling index is greatly improved even when the amount of polymer that is in the organic phase, instead of the aqueous phase, is quite low. For instance at 50% neutralisation the amount of polymer in the organic phase is low but the milling index is about 5 times what would be considered to be commercially adequate. At higher degrees of neutralisation only a very low amount of polymer goes into the organic phase.

EXAMPLE 2

The polymer prepared by conventional neutralisation and distillation and the polymers obtained in Example 1 in the organic phase and in the aqueous phase at 25% neutralisation were all tested as dispersants in 64% by weight china clay dispersions at dosages of 0.12, 0.14, 0.16 and 0.18. The viscosity was recorded. The values are set out in Table 2.

TABLE 2

| Product | Viscosity at Dosage (D/D) | | | | |
| --- | --- | --- | --- | --- | --- |
| | 0.1 | 0.12 | 0.14 | 0.16 | 0.18 |
| Conventional | — | 404 | 248 | 222 | 220 |
| 25% neutralisation organic layer | 254 | 288 | 230 | 214 | 218 |
| 25% neutralisation aqueous layer | — | 396 | 298 | 274 | 284 |

From this it can be seen that the process of the invention results in the production of fractions having very different dispersing properties and, in particular, that the product in the organic layer is capable of giving a suitable low viscosity at a much lower dosage (0.1) than the dosage required to give a similar viscosity using the starting polymer (0.14).

EXAMPLE 3

In this case a polymer prepared by conventional polymerisation techniques as a 23% solution of acrylic acid in equal amounts of isopropanol and water was neutralised to 25% with aqueous ammonia solution after polymerisation. This caused the reaction mixture to separate into two phases. These were separated and the polymer present in each phase was recovered after removal of the isopropanol by distillation. The samples were then completely neutralised with aqueous ammonia solution. The active content was determined by potentiometric titration and the products were adjusted to 40% active as ammonium polyacrylate.

The products were then evaluated as dispersants for china clay at 64% w/w slurry solids content, in comparison with a sample of the polymerisation mixture which had been prepared by neutralisation and distillation in the conventional manner. The results obtained are given in Table 3.

TABLE 3

| % Neutralisation | % Yield Aqueous | % Yield Organic | Mw | Mn | (Mw)/(Mn) | Slurry viscosity (cP) at given dispersant dose (% DOD) | | | | | | | |
|---|---|---|---|---|---|---|---|---|---|---|---|---|---|
| | | | | | | 0.10 | 0.12 | 0.14 | 0.16 | 0.18 | 0.20 | 0.22 | 0.24 |
| 100 | 100 | — | 3204 | 1883 | 1.70 | 1292 | 438 | 238 | 226 | 214 | 216 | 228 | 236 |
| 25 | 55.5 | — | 4025 | 3099 | 1.30 | — | 524 | 260 | 240 | 230 | 230 | 242 | 272 |
| 25 | — | 44.5 | 1689 | 1256 | 1.35 | 358 | 196 | 184 | 180 | 178 | 184 | 188 | 200 |

Examination of gel permeation chromatograms of these products indicates clearly the partition of polymer which takes place between the two phases.

EXAMPLE 4

A copolymer comprising 80 parts acrylic acid, 20 parts 2-acrylamido-2-methyl propane sulphonic acid was prepared as a solution polymer in a mixture of isopropanol and water using conventional polymerisation techniques. After polymerisation, the reaction mixture was divided into two halves. The first half was treated with aqueous sodium hydroxide to give a product which was 100% neutralised, isopropanol was then removed by distillation.

The second half of the polymerisation mixture was treated with sufficient aqueous sodium hydroxide to neutralise the polymer to 25% and the mixture was allowed to separate into two layers. These were then separated from each other and fully neutralised after removal of isopropanol by distillation. The three products were then evaluated as marble grinding aids according to the method used in Example 1. The results obtained are given in Table 4.

TABLE 4

| Percent Neutralisation | Percent Yield Aqueous | Percent Yield Organic | Milling index of polymer |
|---|---|---|---|
| 100 | 100 | — | 0.74 |
| 25 | — | 47.5 | 1.45 |
| 25 | 52.5 | — | 3.64 |

These results show that both polymers are more effective than the starting polymer. This occurs because of the narrower molecular weight distribution of polymers subject to this type of procedure.

EXAMPLE 5

A 20% solution of polyacrylic acid having Mw of 3131 and PD (polydispersity) of 1.677 was dissolved in 50/50 w/w isopropanol/water was neutralised with various basic compounds and the two layers separated. The amount and molecular weight of the polymer in each layer was determined. The results are shown in Table 5.

TABLE 5

| Base | % Neutralisation | Aqueous layer % Extracted | Aqueous layer Mw | Aqueous layer P.D. | Organic layer % Extracted | Organic layer Mw | Organic layer P.D. |
|---|---|---|---|---|---|---|---|
| NaOH | 25 | 75.2 | 3833 | 1.30 | 24.8 | 1452 | 1.402 |
| NH$_4$OH | 25 | 55.6 | 4025 | 1.30 | 44.4 | 1689 | 1.34 |
| LiOH | 25 | NO SEPARATION | | | | | |
| LiOH | 50 | 50.2 | 3957 | 1.427 | 49.8 | 1783 | 1.44 |
| KOH | 25 | 63.5 | 3649 | 1.56 | 36.5 | 1402 | 1.49 |
| NaOH | 15 | 20.6 | 3976 | 1.49 | 79.4 | 2027 | 1.63 |
| NaOH | 50 | 95.7 | 3688 | 1.51 | 4.3 | Very low | |
| NaOH | 75 | 99.3 | 3376 | 1.53 | 0.7 | Very low | |

EXAMPLE 6

Using the same polyacrylic acid solution from example 5 the system was neutralised with sodium hydroxide to 25% theoretical at a variety of temperatures. The results are shown in Table 6.

TABLE 6

| Temp. °C. | AQUEOUS LAYER Yield % | Mw | P.D. | ORGANIC LAYER Yield (%) | Mw | P.D. |
|---|---|---|---|---|---|---|
| 20 | 71 | 3977 | 1.42 | 29 | 1221 | 1.35 |
| 40 | 69 | 3803 | 1.33 | 31 | 1234 | 1.38 |
| 60 | 72 | 3634 | 1.39 | 28 | 1258 | 1.34 |
| 80 | 74 | 3936 | 1.42 | 26 | 1153 | 1.32 |

The results show the partition of the polymer and the average molecular weight is independent of temperature. However, the speed of phase disengagement increased with temperature.

We claim:

1. A process in which a solution in a blend of water and a polar solvent of a water soluble polymer containing neutralised acid groups, derived from monomers comprising acidic monomers selected from acrylic acid and 2-acrylamido-2-methyl propane sulphonic acid, is separated into an aqueous phase containing a higher molecular weight fraction and an organic phase containing a lower molecular weight fraction and in which the polar solvent is a $C_1$ to $C_5$ alcohol, the acid groups are neutralised with a cation selected from sodium, potassium, lithium or ammonium and the molar proportion of neutralised groups is from 10 to 55% when the cation is selected from sodium and potassium, 10 to 70% when the cation is ammonium and 30 to 90% when the cation is lithium.

2. A process according to claim 1 in which the alcohol is isopropanol.

3. A process according to claim 1 in which the alcohol is isopropanol and the proportion water:alcohol is from 1:0.5 to 1:2.

4. A process according to claim 1 in which the concentration of polymer (by weight of the acid polymer based on polymer, water and alcohol) is at least 10%, and each phase contains from 20 to 80% by weight of the polymer.

5. A process according to claim 1 in which the concentration of polymer in the blend is from 15 to 25%, and in which each phase contains from 30 to 70% by weight of the polymer.

6. A process according to claim 1 comprising the preliminary step of forming the solution in the blend by polymerising water soluble acidic monomer in the blend and then adding sufficient alkali to partially neutralise the polymer.

7. A process according to claim 1 in which the cation is selected from sodium and potassium and the proportion of neutralised groups is from 15 to 40% or the cation is ammonium and the proportion neutralised groups is from 15 to 50%.

8. A process according to claim 1 in which the blend is a blend of 1 part water to 0.5 to 2 parts isopropanol, the polymer is present in a concentration of 10 to 30% by weight of the blend, and from 10 to 50% by weight of the acid groups are present as a salt with sodium, the remainder of the acid groups being free acid groups.

9. A process according to claim 1 in which the blend is a blend of 1 part water to 0.5 to 2 parts isopropanol, the polymer is present in a concentration of 10 to 30% by weight of the blend, and in which the process comprises the preliminary step of forming the polymer, in free acid form, as a solution in the blend of polymerisation of polymerisable monomers including the said acidic monomers in the blend and then converting 10 to 50% of the acid groups to the sodium salt form by adding sodium hydroxide.

10. A process according to claim 1 in which either or both of the polymer fractions has a polydispersity of from 1.05 to 1.45.

* * * * *